INVENTOR.
ROBERT E. ARICK
BY Jeffers and Young
ATTORNEYS

Feb. 3, 1970 R. E. ARICK 3,493,186
PROCESS AND APPARATUS FOR WINDING COILS
Filed Dec. 8, 1965 7 Sheets-Sheet 3
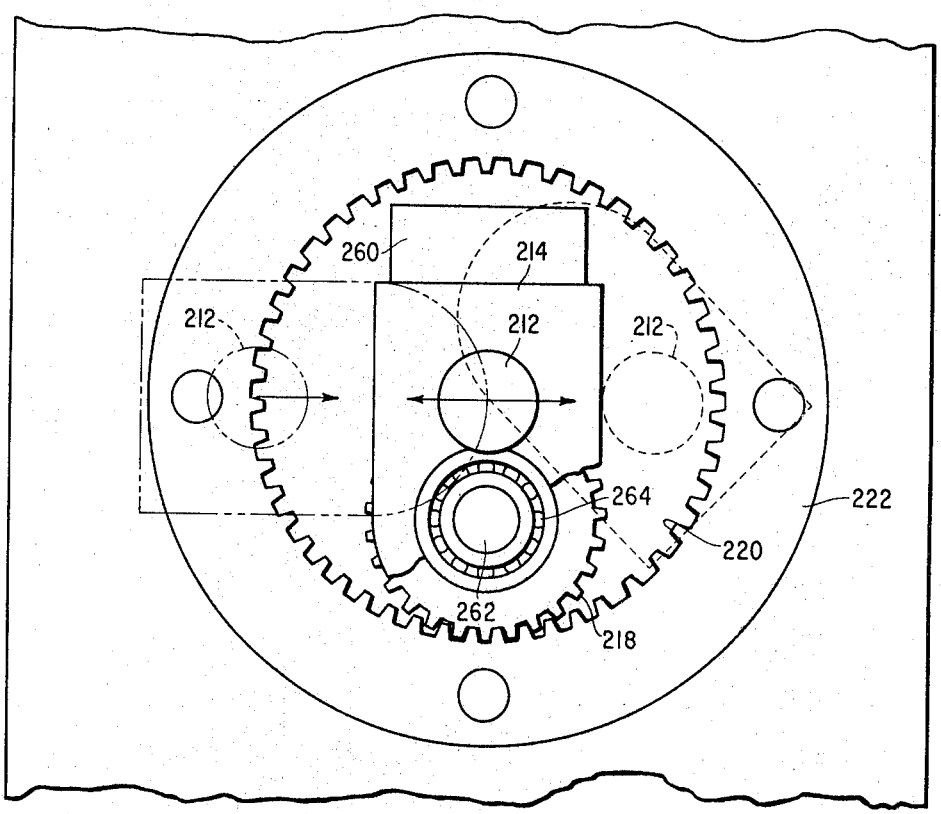
FIG.11
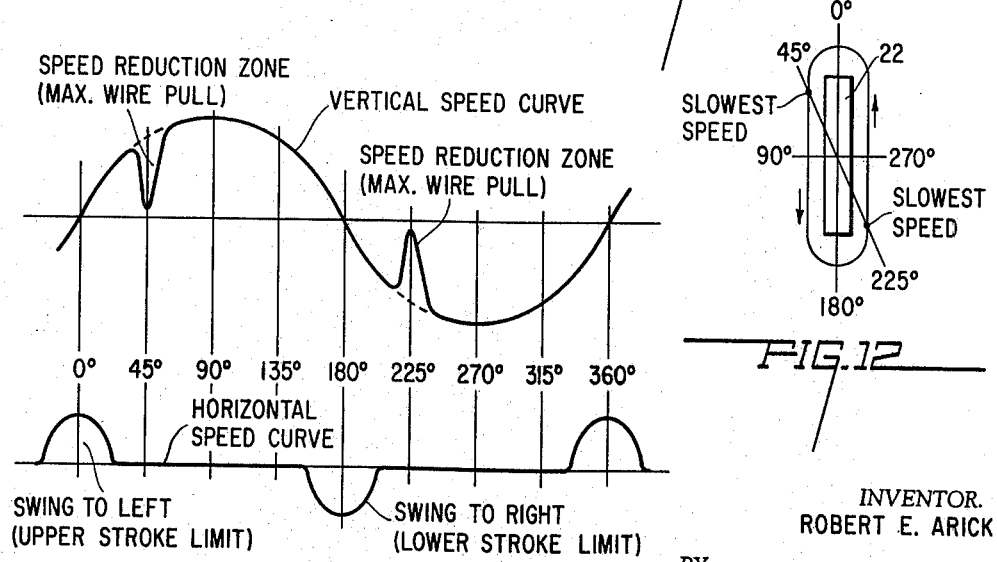
FIG.3
FIG.12
INVENTOR.
ROBERT E. ARICK
BY Jeffers and Young
ATTORNEYS Feb. 3, 1970  R. E. ARICK  3,493,186
PROCESS AND APPARATUS FOR WINDING COILS
Filed Dec. 8, 1965  7 Sheets-Sheet 5
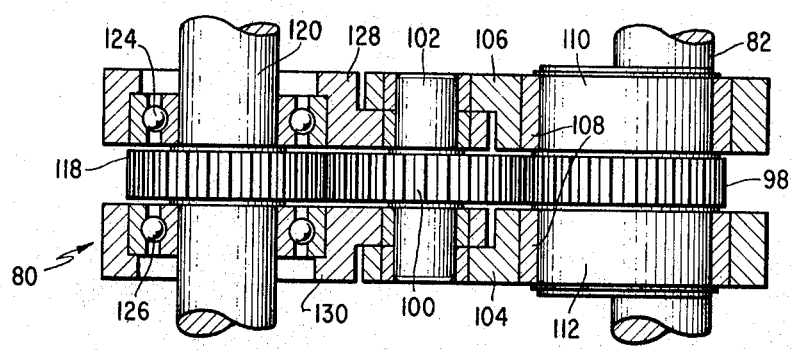
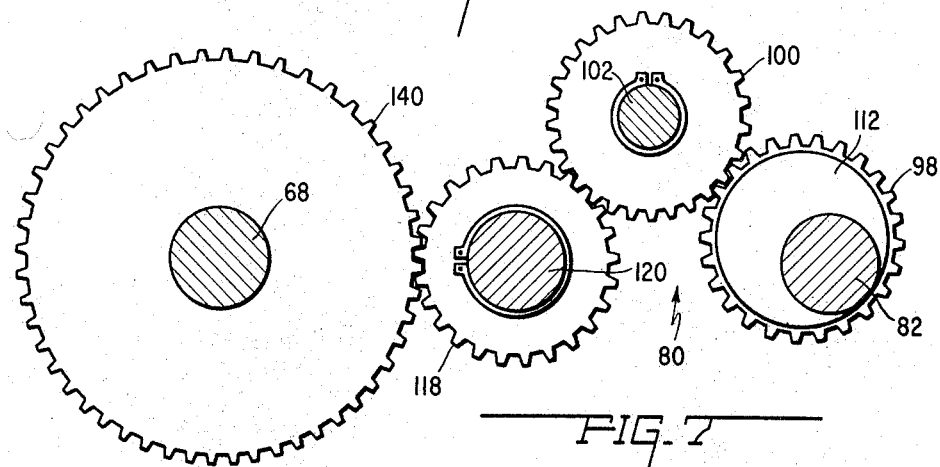
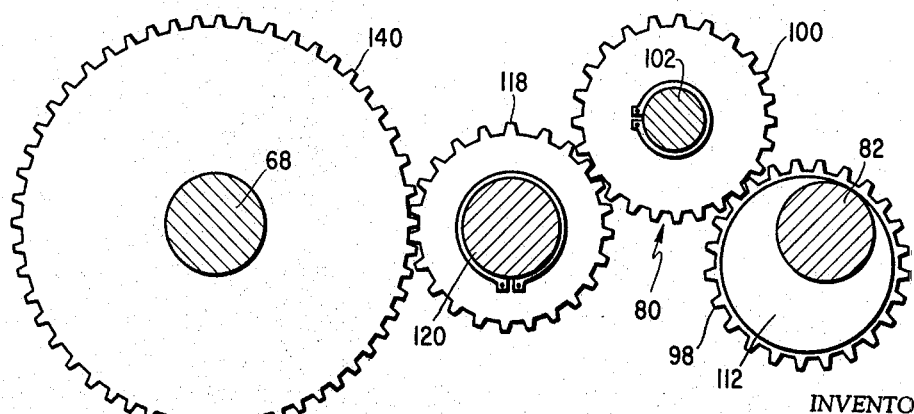
INVENTOR.
ROBERT E. ARICK
BY *Jeffers and Young*
ATTORNEYS INVENTOR.
ROBERT E. ARICK
BY *Jeffers and Young*
ATTORNEYS

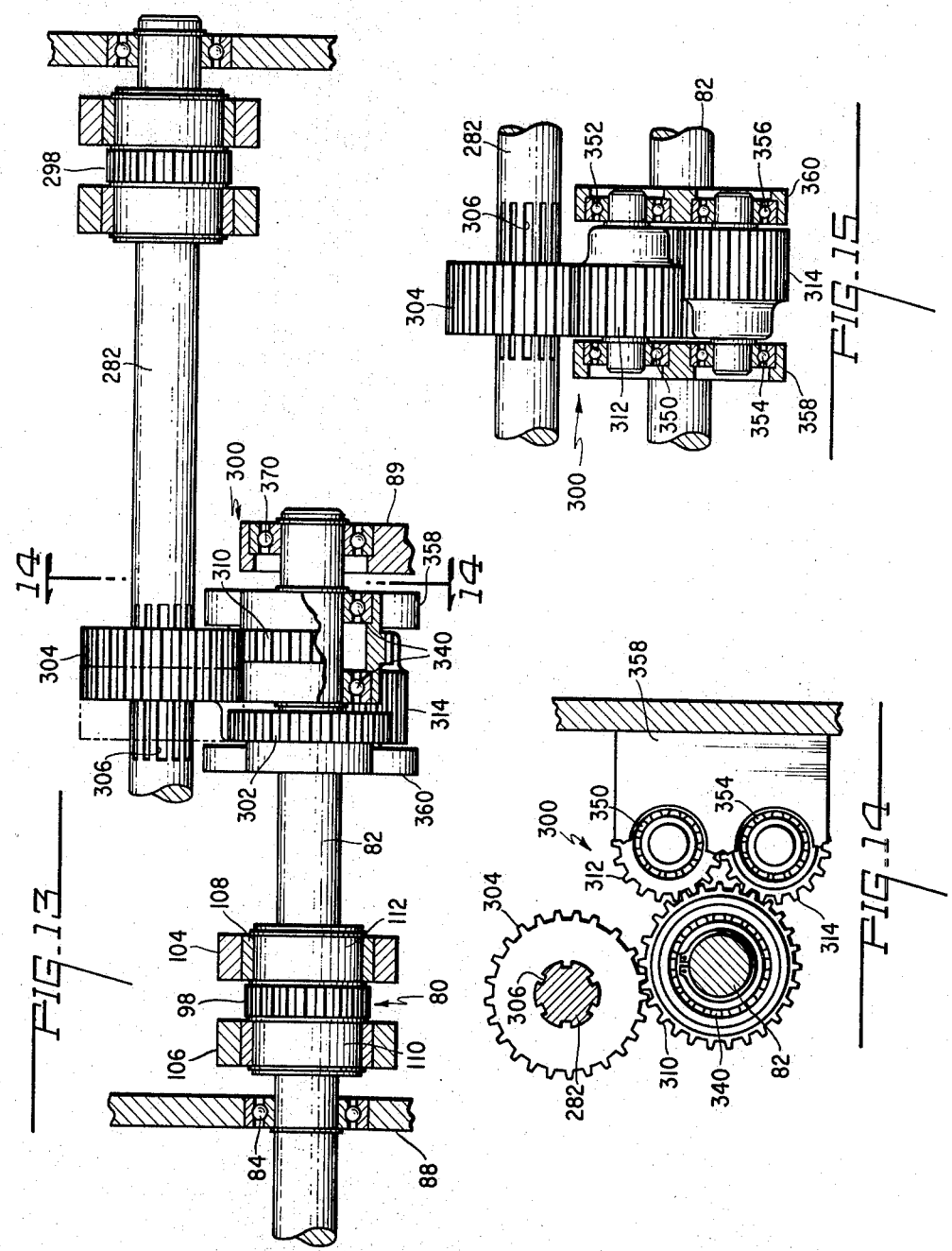

United States Patent Office 3,493,186
Patented Feb. 3, 1970

3,493,186
PROCESS AND APPARATUS FOR
WINDING COILS
Robert E. Arick, 9017 Muldoon Road,
Fort Wayne, Ind. 46809
Filed Dec. 8, 1965, Ser. No. 521,235
Int. Cl. B65h 81/06
U.S. Cl. 242—1.1                                    5 Claims

ABSTRACT OF THE DISCLOSURE

This invention is an apparatus and process for making coils in which the winding head is moved vertically and arcuately by means of a planetary gear which both rotates and revolves within a ring gear and provides a variable winding speed for the winding head, such that the winding head has speed reduction phases which are timed, in relation to the wire-pulling phase of the winding operation, so that minimal stress is placed on the wire at the time it is drawn through the winding apparatus, and speed is maximized during the time in which the wire is not under stress. Consequently, the winding machine is adapted for winding at high speeds, relatively thin cross section wires which would otherwise be broken at high winding speeds.

---

This invention relates to an improved process and apparatus for producing coils and more particularly to the process and apparatus for winding coils in the fabrication of stators, or the like for electrical motors or generators.

In the fabrication of stators for electric motors, generators, and the like, it is the practice to use a coil winding device which coils conductor wire around spaced portions of the stator to form the poles.

In order to fabricate a stator in an efficient and economical manner it is desirable to effect the coil winding as rapidly as possible, a reduction in the coil winding time being directly related to the cost of fabrication so that the shorter the period of time the more economically the stator can be fabricated. Accordingly, those fabricators who are skilled in the art have made numerous attempts at increasing the coil winding speed. But one of the limiting factors in achieving a high speed is the strength limitation of the wire itself which is stressed beyond its tensile strength limitations by the winding head when winding speeds reach their upper limits; this is particularly the case with wire of a small diameter. Consequently, the wire which forms the coils is a limiting factor in determining the upper limit of winding speed. Should the wire snap or break off during the winding operation, this causes a considerable down time of the machine and requires a re-stringing of the wire through the winding head, a time-consuming and expensive occurrence.

The present invention proposes to circumvent this limitation of prior art winding procedures by providing a winding cycle in which the winding head is adapted to move at a variable speed, traveling at a substantial speed during times in which the wire is in a slack condition and reducing in speed while the wire is being pulled through the winding head and is being subjected to tensile force. By providing a variable schedule of speed and by controlling the point in the schedule at which it is necessary to reduce the speed to one which is within the strength limitations of the wire at the time it is drawn through the winding head, much faster speeds are attainable. The winding speed is greatly increased while the wire is slack and conversely the speed is reduced while the wire is taut. The net speed, however, balancing the fast phase and slow phase of winding during the entirety of the winding cycle is substantially increased. By so varying the speed during the cycle in which there is a fast or accelerated duration and a decelerated slow duration it is possible both to increase the net speed and yet maintain the winding speed at all times within the strength limitations of the wire. As a result, I make it possible to overcome the previous limitation on winding speeds which was dependent upon the strength of the wire being drawn.

The improvement of the present invention is based upon the fact that wire being drawn through a winding member is not always subject to the same pulling effort and therefore the speed at which the winding member can travel is so scheduled that it is accelerated to a higher speed during which time the wire is either in slack or under low pull effort and conversely the winding member is at low speed while the wire is taut and under high pull effort.

It is one of the objects of the present invention to reduce the cost of fabricating a stator or other electrical component by greatly improving the speed of fabrication of the electrical component.

It is a further object of the present invention to construct electrical motors or generators using electrical conductors of small diameter and to achieve winding speeds which are nevertheless within the strength limitations of these diameter conductor wires so that breakage of the wire as it is drawn through the spindle is held to a minimum.

A still further object of the present invention is to provide a novel drive means by which the spindle can be driven at preselected cyclical speeds with superimposed decelerated phases which momentarily reduce the spindle speed at precisely the time in which the wire is subjected to the stress of pulling effort and in which the spindle is accelerated while the wire is slack or under a reduced tensile force in order that the winding speed as a whole may be greatly increased. That is, the net period per cycle taking into account the accelerated phase and decelerated phase is substantially decreased over that of the prior art and yet the strength limitations of the small diameter conductor wire are never exceeded.

It is one of the important features of the present invention that faster winding speeds than heretofore obtainable can be realized with yet smaller diameter conductor wire.

It is a further important feature of the present invention to utilize a novel gear drive means which can be adjustable in order to provide whatever decelerated winding speed is necessary at a particular phase of the winding cycle in order to remain within the strength limitations of the conductor wire and hence obviate the costly and time consuming down periods required for restringing conductor wire through the spindle should the strength limitations be exceeded as was often the case with prior art devices.

In accordance with the present invention, not only may a gear means be used but it is well within the teaching of the present invention to employ electrical and hydraulic analogs of the mechanical gear adjuster means. In all events, there is provided a cycle of winding speed with a controllable superimposed schedule of decelerative and accelerative winding speeds.

Other objects and features of the present invention will become apparent from a consideration of the following description which proceeds with reference to the accompanying drawings, wherein:

FIGURE 3 is a graph illustrating the variation of stroke speed, the graph being a plot of speed versus angular position for the spindle which produces the closed series of windings or loops about the poles of the stator during the winding operation.

Figure 1:
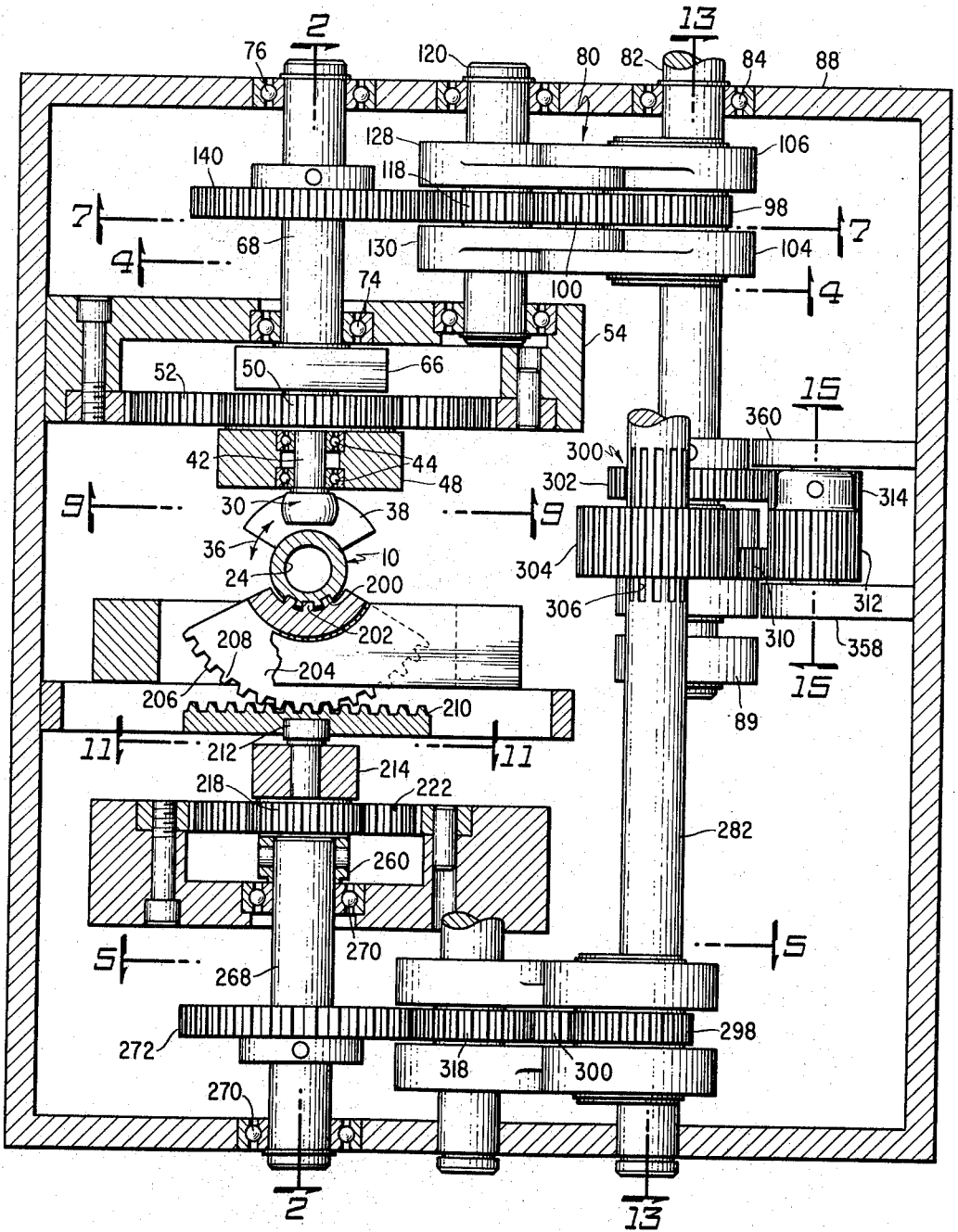
FIGURE 1 is a transverse sectional view taken through the drive mechanism for producing the cyclical movement of the spindle by which the coiling operation is effected.
Figure 4:
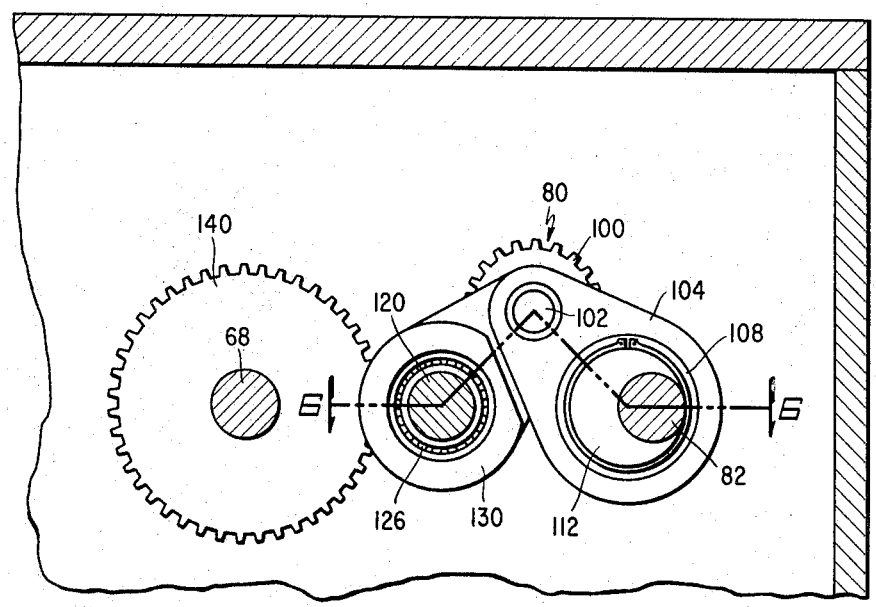
FIGURE 4 is an enlarged sectional view of the adjustable gear cluster which determines the decelerative phase superimposed on the winding speed, these being illustrated as the dips in the sinusoidal wave of FIGURE 3, FIGURE 4 being a sectional view taken on line 4—4 of FIGURE 1.
Figure 5:
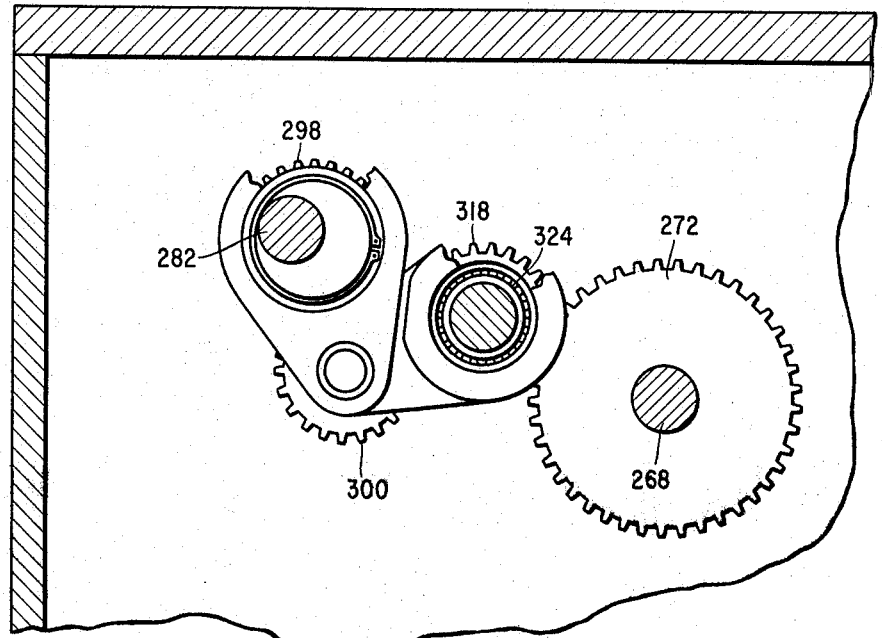
Figure 9:
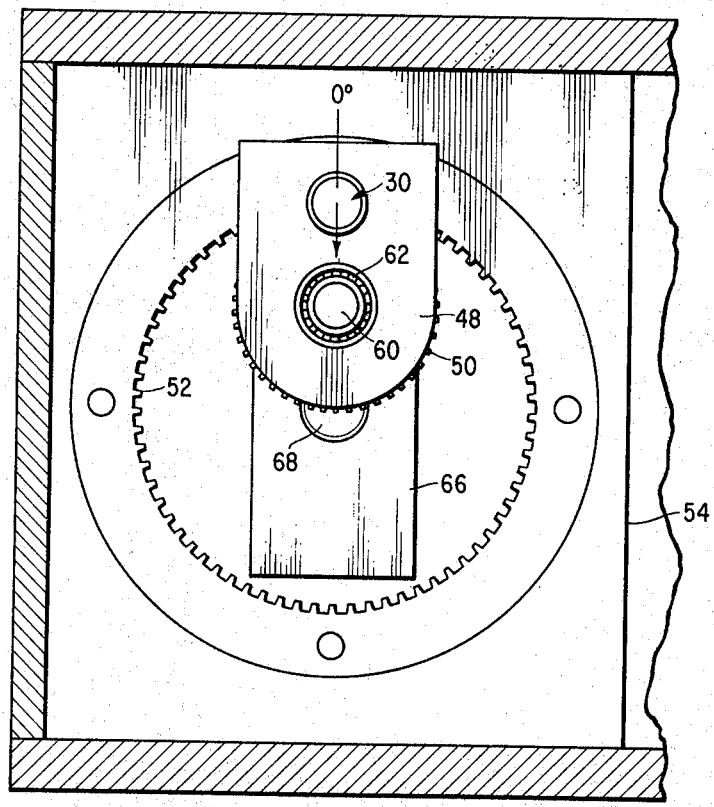
Figure 10:
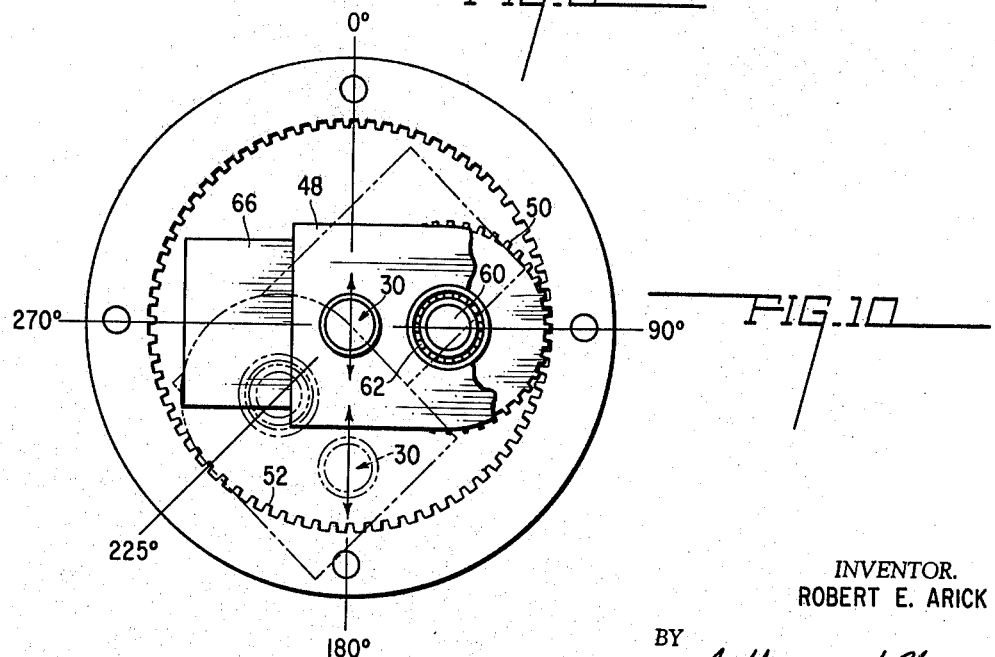

FIGURE 5 is a view similar to FIGURE 4 but showing the adjustable gear cluster for effecting controlled decelerative phase of the spindle as it moves horizontally at the upper and lower ends of the winding loop, it being noted that the gear cluster of FIGURE 5 is 180° out of phase with the gear cluster of FIGURE 4 so that taking into account the gear ratio of 2 to 1 the spindle's horizontal and vertical movements are 90° out of phase with respect to each other;

FIGURE 6 is a sectional view taken through the gear cluster of FIGURE 4, on line 6—6 thereof;

FIGURES 7 and 8 are enlarged sequential views of the output gear and the variable speed gear cluster, FIGURE 7 being a section view taken on line 7—7 of FIGURE 1 and FIGURE 8 being the same as FIGURE 7 but with the gear cluster after it is moved from the position of FIGURE 7 by about 90°;

FIGURE 9 is an enlarged detail view of the spindle and cam, this being a sectional view taken on line 9—9 of FIGURE 1 in which the spindle is at its uppermost position and is labeled the zero degree position in FIGURE 3;

FIGURE 10 is the same as FIGURE 9 in which the spindle has been moved, together with the cam follower through 90° from the position shown in FIGURE 9 and 225° as shown in dotted lines, the speed of the parts being illustrated in FIGURE 3 by the position 90° and 225° respectively;

FIGURE 11 is a sectional view taken on line 11—11 of FIGURE 1 and illustrates the cam follower and associated gear mechanism for the horizontal movement of the spindle, the various angular positions at 90°, 180° and 270° being shown respectively and illustrating in particular how the cam follower follows a true horizontal movement as the associated drive gear moves circularly;

FIGURE 12 shows the closed loop path described by the winding element as the result of the combination vertical and horizontal motions effected by the cams and cam followers of FIGURES 9, 10 and 11 respectively;

FIGURE 13 is a sectional view of the input drive shaft, the view being taken on the line 13—13 of FIGURE 1;

FIGURE 14 is a sectional detail view taken on line 14—14 of FIGURE 13;

FIGURE 15 is an enlarged detail view of the reverse gear forming a part of the transfer gear arrangement for the vertical and horizontal drives of the spindle, the section being taken on line 15—15 of FIGURE 1.

Referring now to the drawings, the winding head or spindle 10 (FIG. 2) reciprocates vertically and such is indicated by the double arrow-headed line 12; the spindle also oscillates angularly in a horizontal direction as indicated by the double arrow-headed line 14. The combination of vertical and horizontal movements are coordinated so that the upper end 16 of spindle 10 describes a closed loop of the configuration indicated in FIGURE 12 and wire 20 is thus coiled around a pole 22 within suitable spaces surrounding the pole in order to make an electrical field of the desired configuration and polarity.

The problem in winding operation is that as the spindel 10 moves upwardly during a portion of its vertical stroke, it pulls wire at twice the speed necessary for generating a loop around the pole and at this stage the wire is under considerable tension as it is pulled upwardly through the central longitudinal passage 24 and pases out of the needle 26 at the upper end 16 of the spindle.

One of the features of the drive mechanism for operating the spindle through the described loop motion is that during the time the wire 20 is pulled under high tension the drive mechanism slows its speed during that particular phase of movement; but as soon as slack occurs in the wire, the winding speed increases immediately and reaches a substantial order of speed, again slowing down as soon as tensile force is reimposed on the wire. Similarly, the angular movement back and forth in the direction of the double arrow-headed line 14 is coordinated with the movement in the direction of the double arrow-headed line 12 and its speed similarly controlled.

VERTICAL DRIVE MECHANISM

Figure 2:
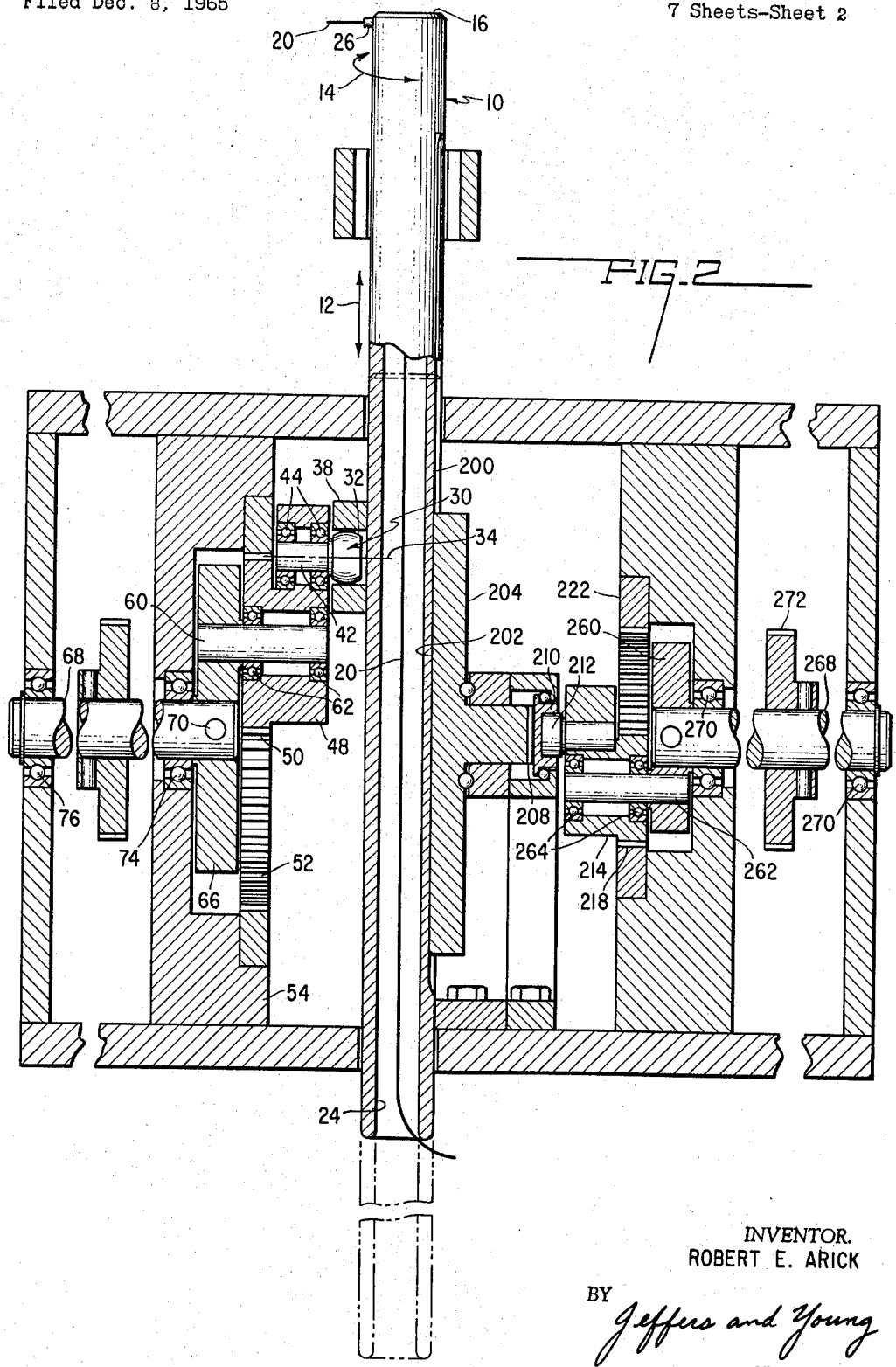
FIGURE 2 is a vertical section view of the operating mechanism for the spindle, the section being taken on line 2—2 of FIGURE 1.

The spindle is caused to vertically reciprocate by the action of cam 30 (FIGS. 1, 2, 9 and 10), the cam 30 being circular and sector shaped at its outer face 32 so that it can combine several movements including rotating on its axis 34 (FIG. 2) reciprocating in the direction of the double arrow-headed line 12 (FIG. 2) and permitting arcuate movement in the direction of the double arrow-headed line 36 (FIG. 1) of cam follower 38 which is secured to the spindle 10, the spindle being oscillated in the direction of the double arrow-headed line 14 (FIG. 2).

The cam follower 38 is arcuately shaped so that the cam 30 is always in engagement therewith throughout the full limit of horizontal arcuate movements 14.

The cam 30 is mounted on the end of a shaft 42 supported on spaced antifriction roller bearings 44, the bearings being received in a carrier 48. The carrier has a gear wheel 50 which meshes with a stationary ring gear 52 in a housing 54 (FIG. 2) so that as the gear 50 revolves around the ring gear 52 the cam 30 describes a vertical reciprocable movement (FIGS. 9, 10). The cam 30 follows a true rectilinear reciprocable movement as the carrier 48 is driven by a shaft 60 journaled in spaced antifriction bearing 62 within the carrier 48 by a crank arm 66 powered by an output shaft 68.

The output shaft 68 rotates the crank arm 66 through pin 70, the rotative effort is transmitted through shaft 60 to the carrier 48 and the carrier 48 counter-rotates relatively to the crank arm 66 because of the meshing of gear wheel 50 with the ring gear 52. The diameter of the ring gear 52 is twice that of the diameter of gear 50 and the cam 30 is on the pitch circle of gear 50; consequently, as the crank arm 66 drives gear 50 within the ring gear 52, the cam 30 will follow a precise vertical path as seen from comparing the angular positions in full and dotted lines in FIGURES 9 and 10, the dotted line position in FIGURE 10 illustrating a slight return upwardly from the bottommost travel of the cam 30. Thus, the drive mechanism converts rotary movement to a vertically upward and downward movement of the cam 30.

If the output shaft 68 were rotated at a constant speed, the cam 30 would describe a sinusoidal speed path of movement, reaching a maximum speed in the full line position in FIGURE 10 and minimum speed at the position shown in FIGURE 9. However, this sinusoidal speed which is shown in FIGURE 3 must be modified owing to the wire pulling considerations previously described and such modification is effected by varying the speed of the output shaft 68 supported on antifriction bearings 74 and 76. The output shaft speed is varied by means of a novel gear cluster control, the gear cluster being designated generally by reference numeral 80 (FIG. 4) which will next be described.

VARIBLE SPEED GEAR CLUSTER

Referring now to FIGURES 4 and 6, power shaft 82 (FIGS. 1, 4, 6) is supported on spaced antifriction bearings 84 by means of two spaced walls 88 (FIG. 1) and 89 (FIG. 13). The shaft 82 has eccentrically mounted thereon, a gear wheel 98 meshing with a floatable intermediate or transfer gear 100 mounted on a pin 102 which is carried by arms 104 and 106 (FIG. 6), said arms being received on bushings 108, fitted onto eccentric bosses 110 and 112 of shaft 82. The transfer gear 100 is meshed with an output gear 118. Gear 100 is counter-rotated by gear 98 and is floating, that is, it can revolve as well as rotate on its own axis of rotation about pin 102 and by controlling the degree of eccentricity of gear 98 with shaft 82, it is possible to regulate the angular speed, the direction of speed, and periods of occurrence thereof for output gear 118 and in this way, it is possible to superimpose a selected variation on the sinusoidal speed vs. angular location of the spindle as shown in FIGURE 3. This variation is evidenced by the dips in the sinusoidal wave and the dips are carefully regulated speed reductions which safeguard the wire during the pull through portion of the winding operation.

Output gear 118 is received on shaft 120 and is supported on antifriction bearings 124, 126 (FIG. 6) and has in combination therewith arms 128, 130 which engage the pin 102 thereby maintaining the transfer gear 100 in driving relation with gear 98 and gear 118 respectively.

Output gear 118 is in turn connected with gear 140 which is received on shaft 68 and is secured thereto, the shaft being then rotatably driven and supported on antifriction bearings 74 and 76 as previously described. The shaft 68 operates the crank arm 66 (FIGS. 2, 9, 10) and thus the power shaft 82 produces rotation of the output shaft 68 and operates the crank arm and operating structure illustrated in FIGURES 2, 9 and 10 for effecting vertically reciprocable movement of the cam 30. The characteristics of the variable speed gear cluster superimposes a variation in speed in accordance with the graph shown in FIGURE 3 at the corresponding angular position as noted in FIGURE 12 thereby to produce selective decelerated movements at the phase of the winding cycle required to relieve excessive strain on the wire as it is being pulled through the central passage 24 of the spindle (FIG. 2).

The transfer gear 100 being both rotatable, and revolvable about the axis of rotation of gear 118, delivers a variable output speed between gears 98 and 118 and thus controllably varies the schedule of speed desired in the sinusoidal speed curve of FIGURE 3, this being the speed of the spindle as it vertically reciprocates. This convenient and readily adjustable variation is productive of the safeguarded speed and thereby contributes to the overall speed-up in winding operation.

TRANSVERSE DRIVE GEAR

At the same time that the spindle is undergoing the described vertical movements, it is caused to oscillate horizontally in coordinated operation with the vertical movement such that as the spindle approaches and attains its uppermost position, it is swung arcuately in one direction and is swung through an equal arcuate movement and in an opposite direction at the lower portion of the spindle stroke. Consequently, the winding head produces a coiling of the conductor wire about the pole piece 22 in the manner illustrated schematically in FIGURE 12.

The described horizontal arcuate movements are obtained by a drive mechanism essentially the same as that previously described for the vertically actuable movements of the spindle except that the arcuate horizontal movement is approximately 90° out of phase with the vertical movement and a "dwell" or nonmovement is provided for a sufficient duration so that as the spindle moves vertically downwardly it will not oscillate while a portion of the winding head passes through the narrow slot between the poles. Thus, referring to FIGURE 12, for a portion of the vertical stroke, there is no arcuate movement whatever. The movement effected by the transverse drive gear is shown in FIGURE 3 which indicated that operation of the transverse gear drive is intermittent and does not operate while the needle passes through or in parallel with the slots separating adjacent poles. Arcuate movement only occurs at the upper and lower positions for the spindle. The purpose, of course, is that of preventing damage to the needle 26 as it moves vertically within the narrow slot region of the stator.

Referring to FIGURES 1, 2 the arcuate movement of spindle is effected by coacting longitudinal splines 200 on the spindle and interfitting lands 202 on an arcuately shaped drive member 204 which permits vertical movement of the spindle without in any way interfering with such movement and at the same time being capable of imparting the requisite angular movement to the extent and at the time required for completing the winding cycle. At the arcuate face 206 of the drive member are a plurality of spaced teeth 208 which mesh with a rack 210, said rack being movable back and forth FIG. 1) by a cam 212 which moves back and forth in a horizontal line in the manner indicated in FIGURE 11. The cam 212 is shown in an extreme leftward position in dotted lines and approaching an extreme righthand position at the righthand side of FIGURE 11. The cam 212 moves on a horizontal line in a back and forth direction (FIG. 11), and its rate of movement follows and intermittent pin curve, shown in FIGURE 3 at its extreme right and left hand positions, reversing its directions of movement at the extreme right and left hand ends. The reason why the cam follows a rectilinear horizontal line of movement is that the gear wheel 218 (FIG. 11) which meshes with the interior gear teeth 220 of ring gear 222 is equal to one-half of the diameter of the internal ring gear 220. The center of the cam 212 is located on the pitch circle of the gear 218. As in the vertical actuating mechanism, there is a carrier 214 and a cam 212, the carrier being cranked about the inner teeth 220 of ring gear 222 by means of a crank arm 260 (FIG. 2) having a crank pin 262 secured at one end to the crank arm 260 and at the other end to the carrier 214 the crank pin then being mounted on antifriction bearings 264. The shaft 268 which produces operation of the crank 260 is mounted on bearings 270 (FIG. 2) and is caused to turn by a gear wheel 272 which is operated by a gear cluster (FIG. 5) of the same general construction as the gear cluster shown in FIGURE 4. It will be noted, however, in comparing FIGURES 4 and 5 that the gear clusters are 180° out of phase which, taking into account the 2/1 gear ratio, produces movements effected on the spindle 90° out of phase with respect to each other.

HORIZONTAL DRIVE MEANS

As in previous drive (FIG. 4), there is a drive shaft 282 which eccentrically drives a gear 298, the gear 298 being in driving relation with transfer gear 300 which in turn engages output gear 318 rotatably supported on antifriction bearing 324. The eccentricity of the drive shaft 282 with respect to gear 298 provides a "dwell" period so that the gear wheel 272 is not moved during the cycle in which the spindle is undergoing its vertical movements through the slot of the poles. The eccentricity is readily adjusted so that movement of the gear 272 to effect the transverse movement of the spindle is provided to whatever extent and whatever phase of the winding cycle is required for the winding opeartion.

CONNECTING MEANS COORDINATING THE VERTICAL AND HORIZONTAL ACTUATORS

The two power shafts 82 and 282 are coupled together through reverse mechanism designated generally by reference numeral 300 (FIGS. 1, 13). When shaft 82 rotates, it likewise rotates gear wheel 302 and shaft 282 is counter-rotated if the wheel 304 has been caused to slide on the splines 306 into driving engagement with gear wheel 302, that is, into the dotted line position (FIG. 13).

The direction of rotation of the shaft 282 and thus the direction of coiling effected by the spindle can be reversed, by reversing the direction of rotation of shaft 282 by power input shaft 82. For example, the direction of coiling referred to in FIGURE 12 may be considered to apply when shaft 82 is coupled with shaft 282 by the gear wheel 304 being in operating engagement with gear wheel 302 as shown in dotted line position (FIG. 13). The direction of coiling can be reversed from that of FIGURE 12 by reversing the direction of roation of shaft 282, this being accomplished by moving the gear wheel 304 longitudinally on splines 306 to the full line position (FIG. 13) and into driving engagement with gear wheel 310. The gear wheel 310 (FIG. 1) is driven by gears 312 and 314, said gear 314 being driven by gear 302. With this gear train arrangement, shafts 82 and 282 rotate in the same direction which is the opposite relation from that when shafts 82 and 282 are coupled directly together through gear wheels 302 and 304. The power shaft thus rotates shaft 282 in either of opposite directions.

As illustrated in FIGURES 1, 13 and 14, the gearing is such that gear 34 can be readily actuated between its dotted line position and full line position effecting either co-rotation of shafts 82, 282 or counter-rotation of said shafts. The gear train of the differential provides minimum frictional resistance, owing to the antifriction bearing mounting arrangement. Thus, gear 310 is mounted on antifriction bearing 340 (FIG. 14) and is driven by gear 312 which is mounted on antifriction bearings 350, 352 (FIG. 15). Gear wheel 314 is mounted on antifriction bearings 354, 356 located in support members 358, 360, the gear 314 being directly driven by gear wheel 302 of power shaft 82. The power shaft 82 is supported at its ends on antifriction bearing 84 and antifriction bearing 370 (FIG. 13). The direction of coil winding is a matter of simple but effective adjustment and takes place in a rapid and efficient manner.

OPERATION

In operation, wire 20 strung through central passage 24 of the spindle 10 and passed through needle 26, is wound around the pole of the stator to form coils thereon. The coil winding is produced by a composite of coordinated vertical reciprocation (FIG. 2) and horizontal arcuate movements in the direction of the double arrow-headed lines 12 and 14, respectively. The coil winding in the direction indicated in FIGURE 12 is effected when gear 304 (FIG. 1) is in operative engagement with gear 302 so that power shafts 82 and 282 are counter-rotated.

When power shaft 82 is rotated it acts through a gear cluster (FIGS. 4, 7 and 8) causing the output shaft 68 to operate at a sinusoidal speed curve indicated in FIGURE 3 but the cycle speed is modified by producing controlled dips in the speed at a predetermined phase of the winding cycle, these dips being indicated in FIG. 3. The extent of the speed reduction or "dip," the placement of the "dip" in the winding cycle and the duration of the "dip" are all determined by the operation of the gear cluster 80 (FIG. 4) so that as the winding cycle progresses the speed of the spindle 10 will be reduced when the wire 20 is tauntened and the speed will be increased when the wire is slack. As the spindle is raised it pulls wire through the passage 24 at twice the amount necessary to follow the coiling path around the pole 22 so that there are periods during which the wire is slack and at other times it is subjected to considerable force to overcome both the inertia and the resistance offered to stripping the wire from the supply reel. By providing these "dips" or speed reductions at the critical periods of the winding cycle I can greatly increase the overall winding speed while at the same time avoiding the imposition of excessive pulling force on the wire beyond its strength limitations. Should the wire be snapped or distorted it can lead to costly down time and involve time-consuming rethreading operation. The present invention offers a significant advance in the art by greatly increasing the winding speeds without exceeding the strength limitations of the wire which was heretofore a limitation imposed on winding speed. Obviously, increasing winding speed means a reduction in the fabrication time of the winding motors and thus offers greater economies.

The method whereby I can control the extent, duration and occurrence of speed reduction is by controlling the eccentricity between the shaft 82 with respect to the gear 98. The characteristics of the gear cluster as indicated in FIGURES 4, 6, 7 and 8 are such that the transfer gear 100, serving to driveably connect gears 98 and 118, can co-rotate and counter-rotate gears 98 and 118 and are further adapted to produce controlled changes in rate of rotational speed produced between gears 98 and 118. By controlling the rotational speed, change in speed and occurrence of change in speed for gear 118 it is possible to transfer such output through intermeshing gear 140 and shaft 68 to crank 66 (FIG. 2) and crank arm 60 which drives carrier 48 at a rotational speed about ring gear 52 at an angular speed the same as dictated by output characteristics of gear cluster 80.

The carrier 48 has the ability to convert the input rotary speed of the desired schedule (in accordance with FIG. 3) to a corresponding linear speed which is proportional to the rotary speed and has the same characteristics as indicated in FIGURE 3. The linear speed conversion is effected by a cam 30 (FIGS. 1, 2, 9 and 10), the cam moving only in a vertical direction. The cam 30 will move only in a vertical direction because the diameter of its turning movement about crank pin 60 is equal to one-half the diameter of the ring gear 54 and its center is located on the pitch diameter of ring gear 52. Thus, as the carrier is rotated clockwise 45° from the position of FIGURE 9, FIGURE 10, the cam 30 is lowered by one-half its movement and as the carrier 48 with its gear teeth 50 is cranked through an additional 180° (to the dotted line position shown in FIG. 10) the follower has traveled downwardly to its maximum extent and has reversed travel to the dotted line position (FIG. 10).

What is to be particularly noted is that the rotary input effort has been converted from a rotary to a rectilinear movement of cam 30, and the speed variation is in direct proportion to the speed variation in the rotary speed as determined by the gear cluster 80. Thus, at the zero° position (FIGS. 3, 9) the speed is zero and is changing direction; at position 45° there is a dip in speed which represents the point at which the wire is being pulled through under maximum tension, this being temporarily relieved by a speed reduction. At position 90° is a point at which maximum speed can be reached since there is a slack condition in the wire. At position 225° the spindle has moved downwardly to its bottommost vertical position and has started to reverse direction.

The cycle of movement follows the same pattern, moving downwardly as in moving upwardly; that is, referring to FIGURE 2, wire is drawn through the passage 24 as the spindle moves downwardly as well as upwardly and a temporary speed reduction must be provided to relieve this condition of stress on the wire, in the manner shown by position labeled 225° in FIGURE 3. The spindle can speed up during phasing of its downward winding movement when the wire 20 is slack the same as it can speed up for portions of its winding cycle during the vertical upward movement. This relationship is clearly shown in FIGURE 3 where the dips in speed are indicated both for vertically upward and for vertically downward movements of the spindle.

REVERSE WINDING

When it is time to index the winding head to a successive set of poles, the diection of winding is reversed from that shown in FIGURE 12. All that is required is to reverse the angular movement of the spindle in relation to the vertical movement from that previously described (FIG. 2). When the direction of arcuate movement is reversed this means that the winding head instead of pivoting to the left at its upward stroke (FIG. 12) is pivoted to the right and likewise pivoting at the lower end of the stroke is reversed from that of FIGURE 12, going from right to left instead of left to right. The coordinated vertical and arcuate movements are thus coordinated so that the direction of winding becomes clockwise instead of counterwise as indicated in FIGURE 12.

The counterwise coiling of FIGURE 12 is accomplished by counter-rotating shafts 82 and 282 and this is effected by moving gear wheel 304 (FIG 1) into engagement with gear wheel 302. The reverse mechanism 300 can also couple the shafts 82 and 282 so that they co-rotate, thus reversing the direction of winding in FIGURE 12. In this case the gear wheel 304 on the shaft 282 is driven by shaft 82 through gear 310, gear 312 and gear 314 which is connected to gear 302. In this way the shafts co-rotate and the relationship of vertical arcuate movements produces a clockwise turning of the spindle which is the reverse of that of FIGURE 12. The adjacent poles are thus of opposite polarity. The indexing of the suspending and winding mechanism may be conventional and typically consists of any one of numerous available indexing methods. The matter of reversing the winding amounts to the simple adjustment of changing position of gear 304.

The arcuate movement of the spindle in either direction of winding consists of swinging of the spindle first in one angular direction while the spindle approaches its uppermost position and then swinging the spindle in the opposite direction as the spindle approaches its lowermost position; such arcuate movements are suspended as the spindle moves through the slot of the rotor, otherwise the head of the spindle might be damaged by the stator as the needle 26 passes through the narrow slot separating adjacent poles.

The characteristics of the operating mechanism are as shown in FIGURE 3 in which it will be seen that the operating mechanism swings the spindle first in one direction followed by a dwell for a sufficient period enabling the spindle to move downwardly through the slot and then arcuately in an opposite direction followed by a second dwell so that the spindle can pass upwardly through the narrow slot. The periods of the dwell and the occurrences of horizontal arcuate movements are regulated by the gear cluster (FIGURE 5) which is similar to the gear cluster (FIG. 4) for operating the vertical spindle actuation. The two gear clusters are, however, 180° in displacement so that, taking into account the 2/1 gear ratio, the actuating mechanisms are 90° out of phase with respect to each other. The shaft 282 is co-rotated or counter-rotated by shaft 82 but the output gear 272 is modified so that it will turn only at the selected time and through the selected number of degrees. The rotary movement of output shaft 268, determined by the gear cluster (FIGURE 5), will produce the pattern of movement in accordance with FIGURE 3.

The output shaft 268 is connected to a crank 260 having a crank pin 262 which operates a carrier 214 effective for converting the rotary movement of shaft 262 to a rectilinear movement. The rectilinear movement is on a horizontal line indicated in FIGURE 11 in which the cam 212 moves to the right and then returns, tracing the upper portion of the curve (FIG. 3). The cam then reverses, moving to the left and returning as indicated by the lower portion of the curve (FIG. 3). Movement of of the cam 212 is produced by the actuating mechanism until the spindle reaches or approaches its uppermost or lowermost positions and such movements vertically and horizontally are coordinated (FIG. 3) so that the spindle head describes a series of closed loop movements.

The cam 212 is producing the desired movement operates through a rack 210 and arcuate gear 206 to move the member 204 which acts through lands 202 and grooves 200 on the spindle to cause it to move arcuately but without interfering with vertical movement. Instead of a land-and-groove connection, the drive mechanism can be produced through a ball-and-track, the tracks being extended along the length of the spindle to permit vertical movement. Either of these expedients is within the teaching of the present invention.

Although the present invention has been illustrated and described in connection with a single example embodiment, it will be understood that this is illustrative of the invention and is by no means restrictive thereof. It is reasonably to be expected that those skilled in this art can make numerous revisions and adaptions of the invention, and it is intended that such revisions and adaptations will be included within the scope of the following claims as equivalents of the invention.

I claim:

1. A process for winding coils of wire in producing stators and the like, comprising the steps of: driving a spindle in a combination of horizontal and vertical movements which in combination describe a series of repeating closed loop movements by means of a gear train operatively connected therewith, and regulating the gear train by cyclic slowing movements of said gear train output to reduce the rate of spindle movement during each loop movement at approximately 180 degree intervals of spindle movement to correspond with the rate at which wire is drawn through said spindle by spindle movement.

2. The process in accordance with claim 1 wherein said spindle driving movement occurs through a horizontal arc in first one direction, vertically moving said winding spindle at the end of the horizontal arcuate movement, directing the winding spindle in an arcuate horizontal direction opposite the first described arcuate movement at the end of the vertical movement, and then redirecting the winding spindle in an opposite vertical direction from the first mentioned vertical movement thereby to direct a spindle in the closed loop movement.

3. The process in accordance with claim 1 including the steps of relocating the spindle to successive winding positions and reversing the direction of winding at each successive location to provide adjacent oppositely wound coils of wire.

4. Apparatus for winding coils of wire in the production of stators and the like, comprising: a spindle for winding coils of wire onto a stator pole or the like, means for driving said spindle through a closed loop to generate a selected number of winding coils on the pole, said driving means including gear means which regulate the speed of movement of the spindle, said gear means including control means for regulating gear means to effect cyclical slowing of said spindle at preselected angular positions spaced at approximately 180 degree intervals during each cycle of closed loop movement when wire is being drawn through the spindle for winding about the stator pole or the like.

5. The apparatus in accordance with claim 4 including adjusting means for defining the duration wherein the spindle is slowed during each approximate 180 degree movement of the spindle head.

References Cited

UNITED STATES PATENTS

| | | | |
|---|---|---|---|
| 3,347,474 | 10/1967 | Frank | 242—1.1 |
| 2,640,652 | 6/1953 | Harvey | 242—1.1 |
| 3,052,418 | 9/1962 | Gorski et al. | 242—1.1 |
| 3,237,657 | 3/1966 | Elvers et al. | 242—9 X |

BILLY S. TAYLOR, Primary Examiner

U.S. Cl. X.R.

74—23